H. B. KEIPER.
COMBINATION TOOL.
APPLICATION FILED AUG. 6, 1919.
1,328,250.
Patented Jan. 13, 1920.
3 SHEETS—SHEET 3.
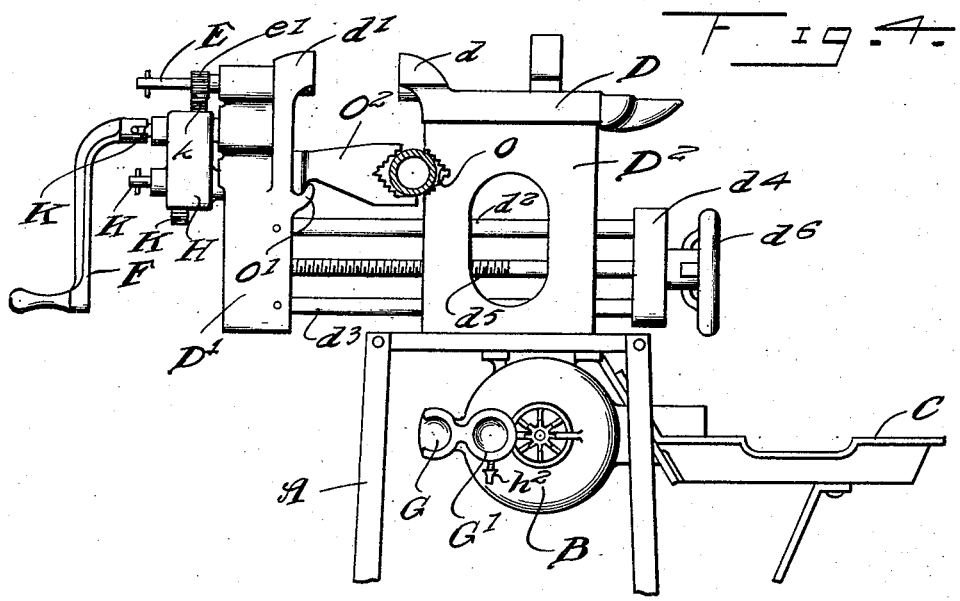
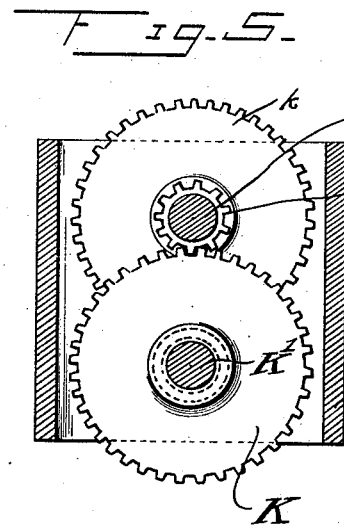
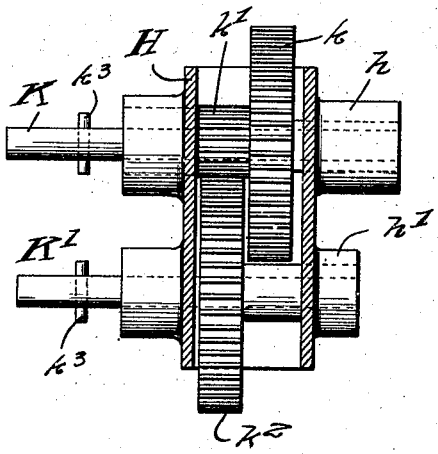

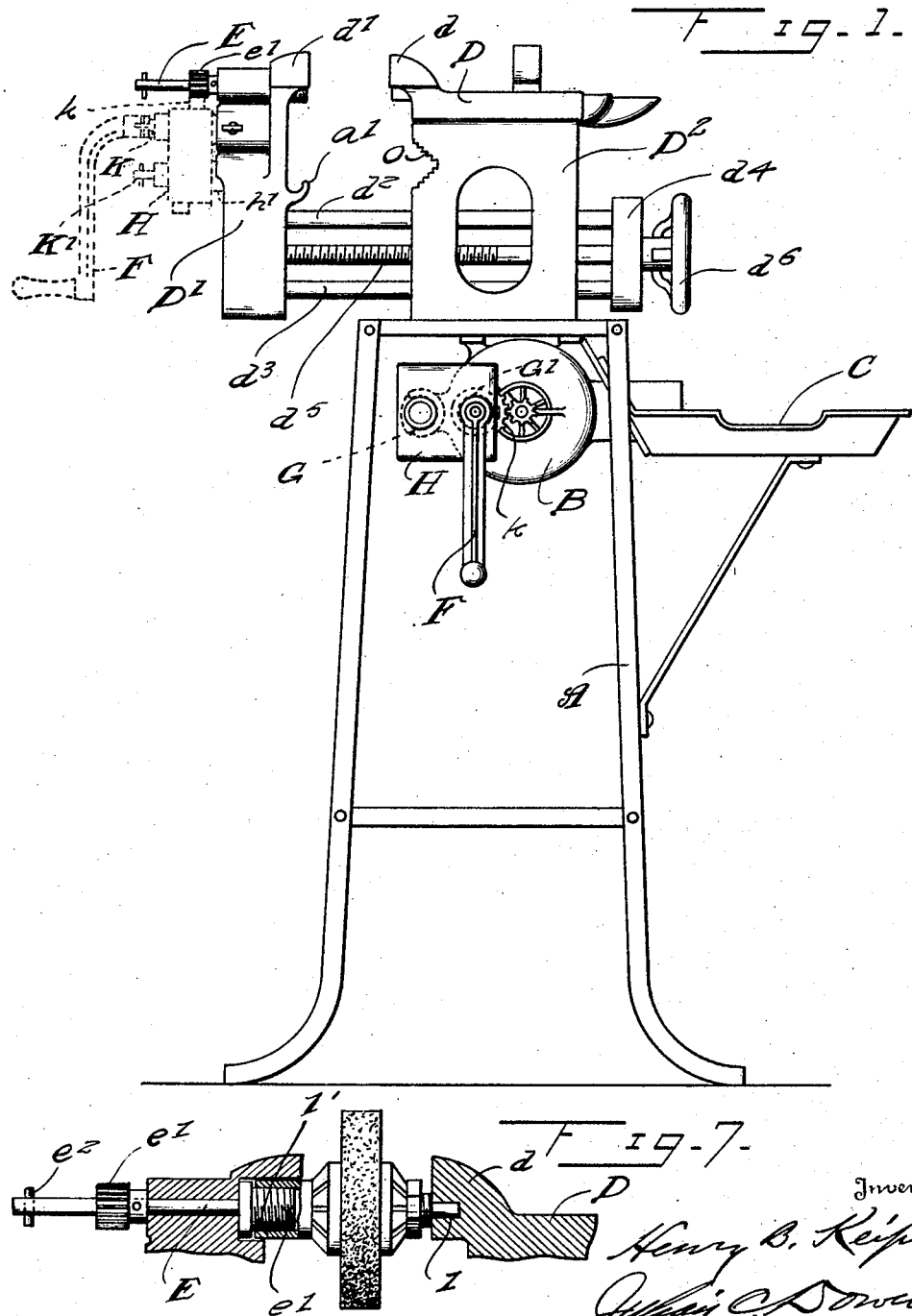

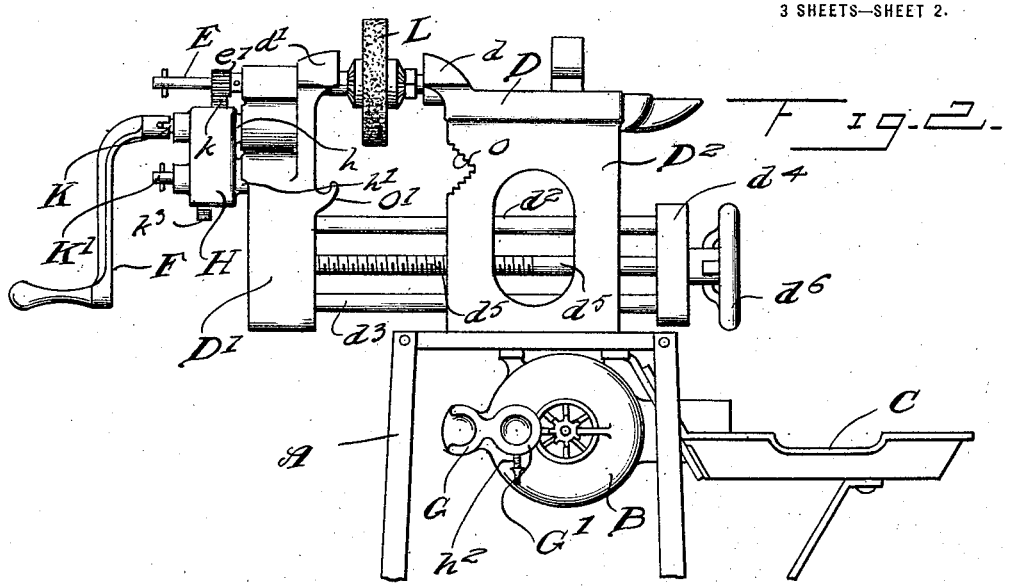
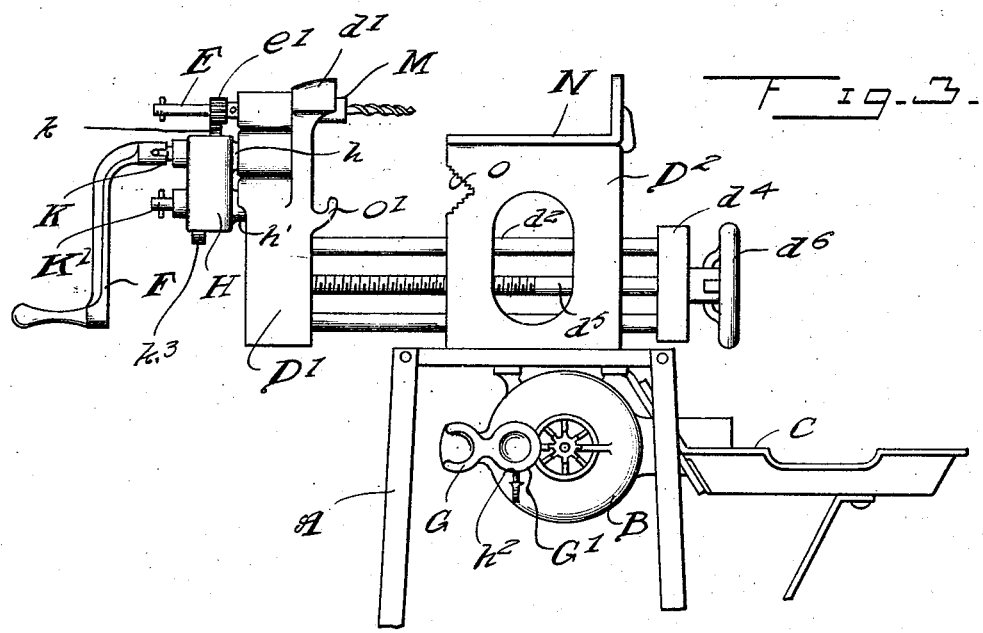
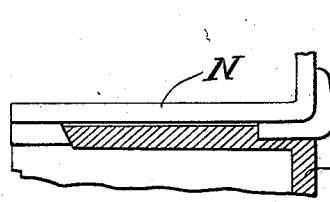

UNITED STATES PATENT OFFICE.

HENRY B. KEIPER, OF LANCASTER, PENNSYLVANIA.

COMBINATION-TOOL.

1,328,250.  Specification of Letters Patent.  Patented Jan. 13, 1920.

Application filed August 6, 1919. Serial No. 315,653.

*To all whom it may concern:*

Be it known that I, HENRY B. KEIPER, a citizen of the United States, residing at Lancaster, in the county of Lancaster and State of Pennsylvania, have invented certain new and useful Improvements in Combination-Tools; and I do hereby declare the following to be a full, clear, and exact description of the invention, such as will enable others skilled in the art to which it appertains to make and use the same.

This invention relates to blowers and forges and blacksmiths' tools, and more particularly to a convertible machine of the character referred to for blacksmiths' use, and has for its object to provide a combination tool or machine comprising a rotary blower and forge, a drill and a grindstone, driven by the same mechanism, together with an anvil, an ordinary vise and a pipe vise all combined in a single machine with suitable attachments for converting the machine into one or the other of the machines or tools specified, as desired for use in a blacksmith shop.

The invention will first be hereinafter more particularly described, with reference to the accompanying drawings, which are to be taken as a part of this specification, and then pointed out in the claims at the end of the description.

In said drawings Figure 1 represents a side elevation of a rotary blower and forge, with combination tools, including an anvil and vise, mounted on the machine frame and illustrating in dotted lines the same driving gearing as that used for operating the blower and forge, applied to drive a rotating device or other tool when the machine is converted, for example, into a drill or grinder; Figs. 2 and 3 are side elevations of the machine converted into a grinder and a drill, respectively, the lower portion of the frame being broken away; Fig. 4 is a side elevation of the same illustrating the machine adapted for use as a pipe vise; Figs. 5 and 6 are detail views, partly in section, of the multiplying and reducing gearing for driving either the blower or a drill or grinder or other tool; Fig. 7 is a fragmentary detail sectional view illustrating the mode of attaching the grinder; and Fig. 8 is a detail illustrating the mode of attaching the anvil and work holder.

Referring to said drawings in which the same reference letters are used to denote corresponding parts in different views, the letter A denotes a machine frame which is of ordinary construction and supports a rotary blower B, and forge having a hearth or fireplace C, and has mounted thereon, above the blower, an anvil D, said anvil being removably secured to a standard $D^2$ and having at one end a vise member $d$, which is opposed to a movable vise member $d^1$ mounted on a laterally movable block or upright $D^1$. The upright $D^1$ is carried by rods $d^2$ and $d^3$, which pass freely through apertures in the standard $D^2$, and are secured at the outer ends thereof to a head-piece $d^4$, from which an adjusting screw $d^5$ extends through a threaded element of the standard and has its inner end rotatively secured to the upright $D^1$; said screw being provided on its outer end with a hand wheel $d^6$ whereby the upright member $D^1$ may be moved toward or from the stationary vise member or standard by turning the hand wheel $d^6$ to the right or left, as desired for operating the vise. The upright member $D^1$ has a tool driving shaft E journaled therein, said shaft having an enlarged exteriorly threaded portion $e$ thereon, fitted in a socket bearing in the upright $D^1$, and a pinion $e^1$ adapted to engage or mesh with one of a series of multiplying or reducing gears of a shifting driving mechanism hereinafter mentioned. Said shaft E has a projecting pin or stud $e^2$ thereon at or near its free end for engagement with a transverse groove in one end of a handle F detachably secured thereto, as shown.

One side of the blower casing is formed or provided with sockets G and $G^1$ to receive bosses $h$ and $h^1$, respectively on the gear casing H, for securing said gear casing thereto; the boss $h$ having a set-screw $h^2$ screwed therein for securing the boss $h$ in a fixed position in said socket. For convenience in assembling the socket G is preferably semi-cylindrical in form, as shown. The gear casing H has journaled therein two short or stub shafts K and $K^1$ which extend therethrough in the plane of said bosses $h$ and $h^1$, respectively. The shaft K has a gear wheel $k$ and a pinion $k^1$ fixed thereon, the pinion being in mesh with a gear $k^2$ fixed on the shaft $K^1$, and the projecting end of each shaft is provided with a pin or stud $k^3$ for engagement with the transverse groove or recess at the end of the socket on the operating handle F through which motion may be imparted to either shaft for driving the blower or other device with greater or less speed, as desired, according to the shaft with which the handle is connected. Any desired arrangement or number of multiplying or reducing gears may be used. The upright or movable vise member $D^1$ has formed therein sockets corresponding in size and shape with the sockets G and $G^1$ on the gear casing B so as to adapt the gear casing to be attached to said vise member with the gear $k$ in mesh with the driving gear $e^1$ on the tool driving shaft E, for the purpose of imparting motion to either a drill as shown in Fig. 3, or a grindstone or emery grinder as shown in Fig. 2 or to some other tool carried by said driving shaft E. As shown in Fig. 2 of the drawings, an emery grinder L is fixed on a shaft having at one end a journal $l$ fitted in a bearing or socket in the vise member $d$ on the anvil D and having on its other end an internally threaded member $l^1$ which is screwed on the externally threaded member $e$ of the driving shaft E, as shown in Fig. 7. If desired to convert the machine into a drill, the emery grinder is removed and a drill chuck M carrying a drill $m$, is screwed on said member $e$ of the tool driving shaft, as shown in Fig. 3, and the stationary vise member is removed from the standard $D^2$ and a work holder N is secured on said standard in place of the anvil. The anvil and work holder may be secured on the standard in any suitable manner, but for convenience in attaching and removing the same the standard has open-ended slots or recesses at opposite ends thereof to receive protuberances or lugs on the underside of the anvil plate and work holder, and secure the two parts together, and to this end the lug at one end has an inclined surface engaging a correspondingly inclined surface of the recess at that end of the standard so that in attaching the work holder or anvil the lug with the inclined face is first inserted in its recess and the anvil or work holder is then moved endwise for interlocking engagement with the other lug, thereby securing the anvil or the work holder firmly in place without the use of fastening bolts, in the manner shown in Fig. 8. The standard $D^2$ has a V-shaped recess O, with a serrated surface, while the movable upright member $D^1$ has a curved finger or hook $O^1$ thereon for interlocking engagement with the tongue or flange at one end of a removable vise member $O^2$ which also has a V-shaped end portion, with serrated surface confronting the V-shaped recess in the standard to provide a pipe vise, as shown in Fig. 4 of the drawings.

I thus provide a very simple and efficient blacksmith's combination tool, including a rotary blower and forge, and adapted to be readily converted into either a drilling machine or an emery grinder or other tool, and to be driven by the same driving gears that are used for driving the blower, together with an ordinary vise, and a pipe vise, either of which devices is available for use at will as a part of one and the same machine.

Having thus described my invention, what I claim as new and desire to secure by Letters Patent is:—

1. A convertible blower and combination tool, comprising a supporting frame having tool-carrying means and a rotary blower casing mounted thereon, said means including a tool-driving shaft, and said casing having a rotary blower journaled therein, a gear casing adapted for attachment to either said blower casing or said tool-carrying means with a gear therein in mesh with a gear on the blower shaft or on the tool driving shaft, for driving alternately said blower or other device by the same driving mechanism.

2. In combination with a supporting frame having tool-carrying means thereon including a tool-driving shaft, a rotary blower casing on said frame, and a gear casing having a plurality of shafts journaled therein with multiplying gears thereon, each shaft having means thereon for attaching an operating handle thereto, and means on said blower casing and on said tool-carrying means for securing said gear casing thereto with a gear therein in mesh with a gear on said blower shaft or on said tool-driving shaft, for driving alternately said blower and a drill or other tool by the same driving mechanism.

3. In combination with a supporting frame having tool-carrying members thereon, one member being movable and having a tool-driving shaft journaled therein, said shaft having a driving gear thereon, a rotary blower casing mounted on said frame and having a rotary blower housed therein, said blower having a driving gear on its shaft, a gear casing provided wth parallel shafts and a train of gears on said shafts together with an operating handle and adapted to be attached to either the blower casing or said tool-carrying member with a gear therein in mesh with the gear on said blower shaft or with the gear on said tool-driving shaft, for driving alternately said blower or other tool by the same driving mechanism.

4. In combination with a supporting frame having coöperating stationary and movable vise-members thereon with means for actuating said movable member, a tool-driving shaft journaled in said movable member, a rotary blower casing on said frame having a plurality of sockets therein adjacent to and having their axes parallel with the blower shaft, said movable vise member having correspondingly shaped sockets thereon with their axes parallel with said tool-driving shaft, and a gear casing having two shafts journaled therein each provided with means for attaching thereto an operating handle, and bosses thereon extending in the plane of the shafts and adapted to be inserted in the sockets on said movable vise member and the sockets on said blower casing with a gear in said gear casing in mesh with a gear on said tool-driving shaft or on said blower shaft, for driving alternately said blower and a drill or other tool by the same driving mechanism.

5. In combination, a rotary blower and forge mounted on a supporting frame, a standard on said frame carrying a tool member, an upright tool-carrying member supported on rods slidably fitted in said standard and means for moving said upright toward and from said standard, said upright having a tool-driving shaft journaled therein and sockets parallel with said shaft, correspondingly shaped sockets being formed in the blower casing parallel with the blower shaft, and a gear casing having a plurality of shafts journaled therein with a gear on one engaging a gear on the other shaft, each shaft having means thereon for attaching an operating handle thereto, and bosses on said gear casing in the plane of the shafts journaled therein adapted to be inserted in the sockets on said upright and blower casing with a gear in said gear casing in mesh with a gear on said tool-driving shaft or said blower casing, for driving alternately said blower and a drill or other tool by the same driving mechanism.

6. In combination with a rotary blower and a rotary tool mounted on the blower frame, a gear casing containing a plurality of shafts and driving gears operable by either shaft, said shafts having means thereon for attaching an operating handle and means carried by said gear casing, together with interengaging means adjacent said blower and tool, whereby said gear casing may be removably secured in position to operate either the blower or the tool by the same driving mechanism.

In testimony whereof I affix my signature in the presence of two witnesses.

HENRY B. KEIPER.

Witnesses:
ARTHUR M. SMITH,
ED DONOHOE.